United States Patent [19]
Nelson

[11] Patent Number: 5,598,869
[45] Date of Patent: Feb. 4, 1997

[54] PRESSURE REGULATING UNIT

[75] Inventor: John Nelson, Durham, N.H.

[73] Assignee: Robertshaw Controls Company, Richmond, Va.

[21] Appl. No.: 565,321

[22] Filed: Nov. 30, 1995

[51] Int. Cl.$^6$ .................................................. G05D 16/06
[52] U.S. Cl. ............................ 137/505.11; 137/505.12; 137/557; 137/882; 137/883
[58] Field of Search ................................. 137/360, 383, 137/505.11, 505.12, 557, 882, 883

[56]  References Cited

U.S. PATENT DOCUMENTS

| | | | |
|---|---|---|---|
| 2,662,348 | 12/1953 | Jacobson | 137/505.12 |
| 3,088,486 | 5/1963 | Salmon et al. | |
| 3,153,424 | 10/1964 | Acker et al. | |
| 3,593,549 | 7/1971 | Lakins et al. | |
| 3,834,417 | 9/1974 | Holben et al. | |
| 3,929,148 | 12/1975 | Midy | 137/84 |
| 4,171,004 | 10/1979 | Cerrato et al. | |
| 4,174,733 | 11/1979 | Eidsmore et al. | |
| 4,349,136 | 9/1982 | Fallon et al. | |
| 4,494,568 | 1/1985 | Young | |
| 4,570,677 | 2/1986 | Roxton et al. | |
| 4,846,226 | 7/1989 | Merritt | |
| 4,870,994 | 10/1989 | Raymond | |
| 5,303,733 | 4/1994 | Nelson | |

OTHER PUBLICATIONS

Multiplex literature, "Simple Solutions, A Specification Guide for Soft Drink Systems in All Installations" (Undated).
Dobario Enterprises, Inc. product literature (Undated).
Standard–Keil product literature (Undated).
Coca–Cola Installation Manual for Ice–Cooled Drop–In Dispenser Installation, p. 8 (Undated).

Primary Examiner—Gerald A. Michalsky
Attorney, Agent, or Firm—Fish & Richardson P.C.

[57]  ABSTRACT

A pressure regulating unit for providing two different controlled pressures includes a block made of a single piece of metal and having a mounting structure integrally provided thereon and a gas flow passage provided therein. A first regulator has a gas inlet communicating with a source of high-pressure gas having varying pressure and communicating with the gas flow passage. The first regulator is a step-down regulator for supplying a substantially constant pressure gas to second and third pressure regulators, enabling the second and third pressure regulators to be fixed at a predetermined, unmonitored pressure. At least the second and third regulators are supported on the mounting structure, and at least the second regulator has a gas inlet communicating with the flow passage. The second and third regulators provide the two pressures.

11 Claims, 4 Drawing Sheets

PRESSURE REGULATING UNIT

BACKGROUND OF THE INVENTION

The invention relates to a pressure relating unit for providing controlled pressures, e.g., for use in displacing liquid in a carbonated beverage dispensing system.

In restaurants and other facilities where carbonated beverages are prepared on demand, a single source of pressurized carbon dioxide gas is typically used to carbonate the water at a carbonator and to pump the different syrups for different beverages. The syrups typically are contained in canisters or in bag-in-box containers.

Typically a single carbon dioxide tank that delivers carbon dioxide at high pressure is used. The carbon dioxide tank is typically connected to a wall-mounted pressure regulating system in which the regulators are mounted on a supporting bracket, and the high-pressure gas is passed from one regulator to another by a pipe connected between the two.

My U.S. Pat. No. 5,303,733 describes a regulating unit including a block that is made of a single piece of metal and has a high-pressure gas flow passage integrally provided therein. Two pressure regulators are supported on the block, and at least one pressure regulator has a gas inlet communicating with a port to the high-pressure gas flow passage.

SUMMARY OF THE INVENTION

The invention features, in general, a pressure regulating unit for providing two different controlled pressures. The unit includes a block made of a single piece of metal and having a mounting structure integrally provided thereon and a gas flow passage provided therein. The unit also has first, second and third pressure regulators. The first regulator has a gas inlet communicating with a source of high-pressure gas having varying pressure and communicating with the gas flow passage. The first regulator is a step-down regulator for supplying a substantially constant pressure gas to the second and third pressure regulators, enabling settings for the second and third pressure regulators to be fixed to provide predetermined, unmonitored pressure. At least the second and third regulators are supported on the mounting structure, and at least the second regulator has a gas inlet communicating with the flow passage. The second and third regulators provide the two pressures that are output.

This construction simplifies the assembly and mounting of the unit and reduces the number of connections that need to be checked for gas leaks. In addition, the use of regulators with fixed-pressure settings and the use of a step-down regulator provides accurate output pressures, even with large variation in source pressure, without the need to provide gauges to monitor output pressures or to adjust settings of the regulators to accommodate large variation in source pressure. It also avoids problems associated with improper adjustment of the regulator settings.

In preferred embodiments, the first, second and third regulators are supported on the mounting structure. The block defines chambers associated with at least the second and third regulators. The block defines passages connecting the chambers to the gas flow passage, the passages lead to gas inlets in the second and third regulators. The block defines passages connecting the chambers to outlet passages. Relief valves are associated with the first and third regulators. The block defines a chamber associated with the first regulator. At least the second and third regulators include pressure adjusters fixed in place after adjustment to a desired setting. The first regulator includes a pressure adjuster fixed in place after adjustment to a desired setting. The pressure adjusters are fixed in place with an adhesive. The unit includes an attachment structure for mounting the unit. The mounting structure is located on a face of the block, and the unit includes a pressure gauge supported on the mounting structure, at least the second and third regulators have a first profile extending from the face of the block and the gauge has a second profile extending from the face of the block smaller than the first profile. The gauge measures the varying pressure from the pressure source.

According to another aspect of the invention, a pressure regulating unit for providing two different controlled pressures includes a block made of a single piece of metal and has a mounting structure integrally provided thereon and a gas flow passage provided therein. The gas flow passage has a high pressure inlet for connection to a source of high-pressure gas having varying pressure and a first port for connection to a pressure regulator. First, second and third pressure regulators are supported by the mounting structure. The first regulator has a gas inlet communicating with the first port and the first regulator is a step-down regulator for supplying a substantially constant pressure gas to the second and third pressure regulators.

In preferred embodiments, the block defines chambers associated with the first, second and third regulators. The block defines passages connecting the chambers to the gas flow passage, the passages lead to gas inlets in the first, second and third regulators. The block defines an additional passage connecting the chamber of the first regulator to the gas flow passage. The pressure regulating unit further includes an obstruction, for example, a ball, in the flow passage dividing the flow passage into a first segment upstream of the first regulator and in communication with the gas inlet of the first regulator and a second segment downstream of the first regulator and in communication with the additional passage. The block defines passages connecting the chambers of the second and third regulators to outlet passages. The block defines passages connecting the chambers of the first and third regulators to relief valves.

Other advantages and features of the invention will be apparent from the following description of a preferred embodiment thereof and from the claims.

BRIEF DESCRIPTION OF THE DRAWINGS

The drawings will be described first.
Drawings

STRUCTURE

Figure 1:
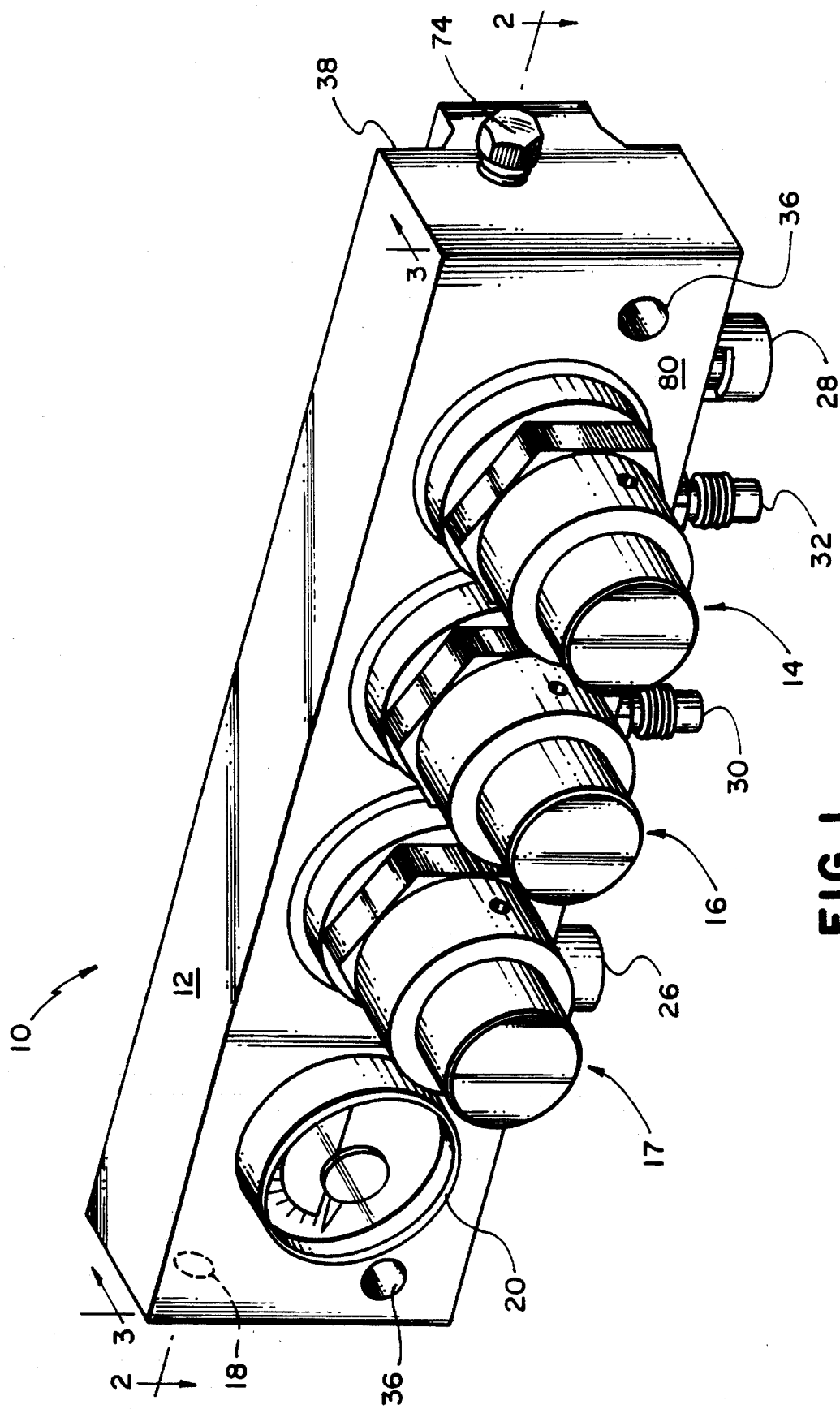
FIG. 1 is a perspective view of a pressure regulating unit according to the invention.
Figure 1A:
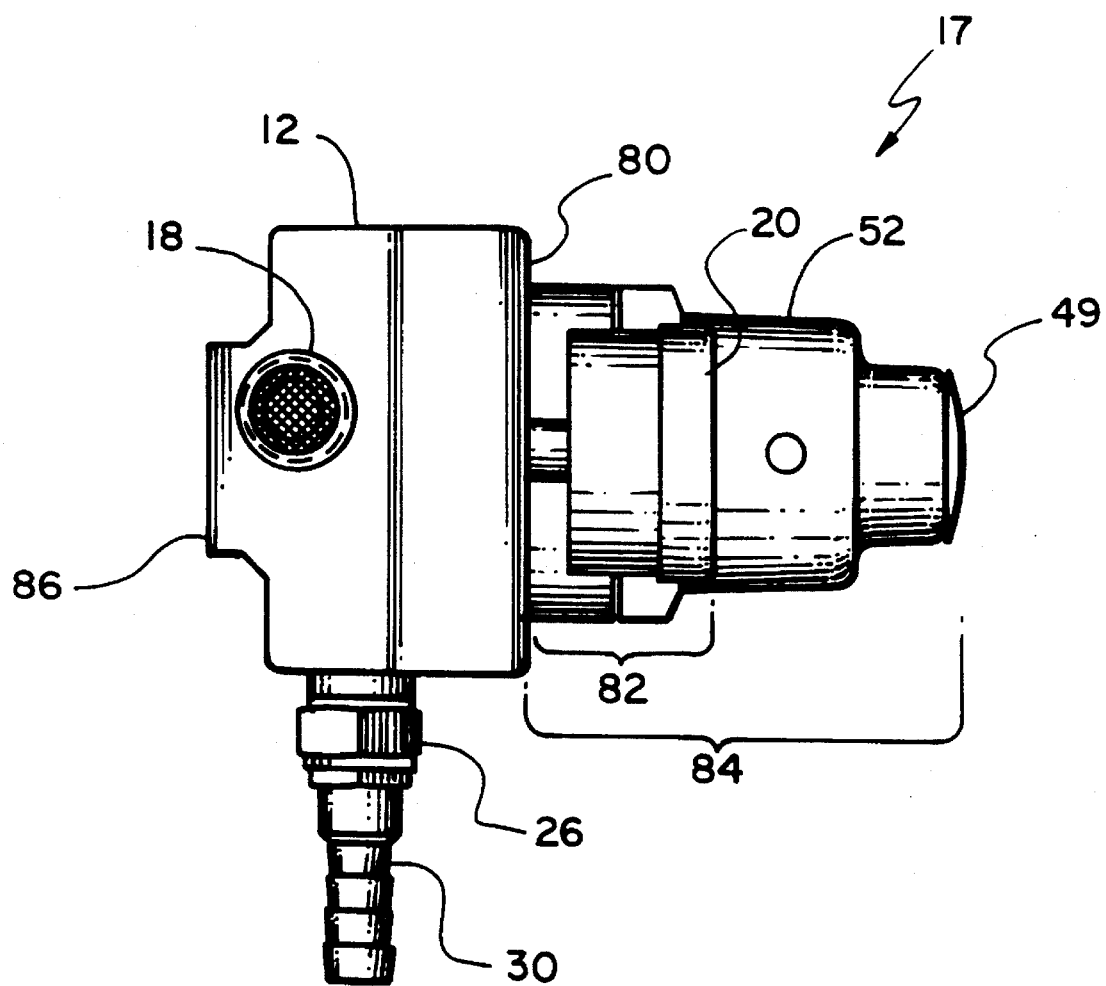
FIG. 1a is a side view of the FIG. 1 pressure regulating unit.
Figure 2:
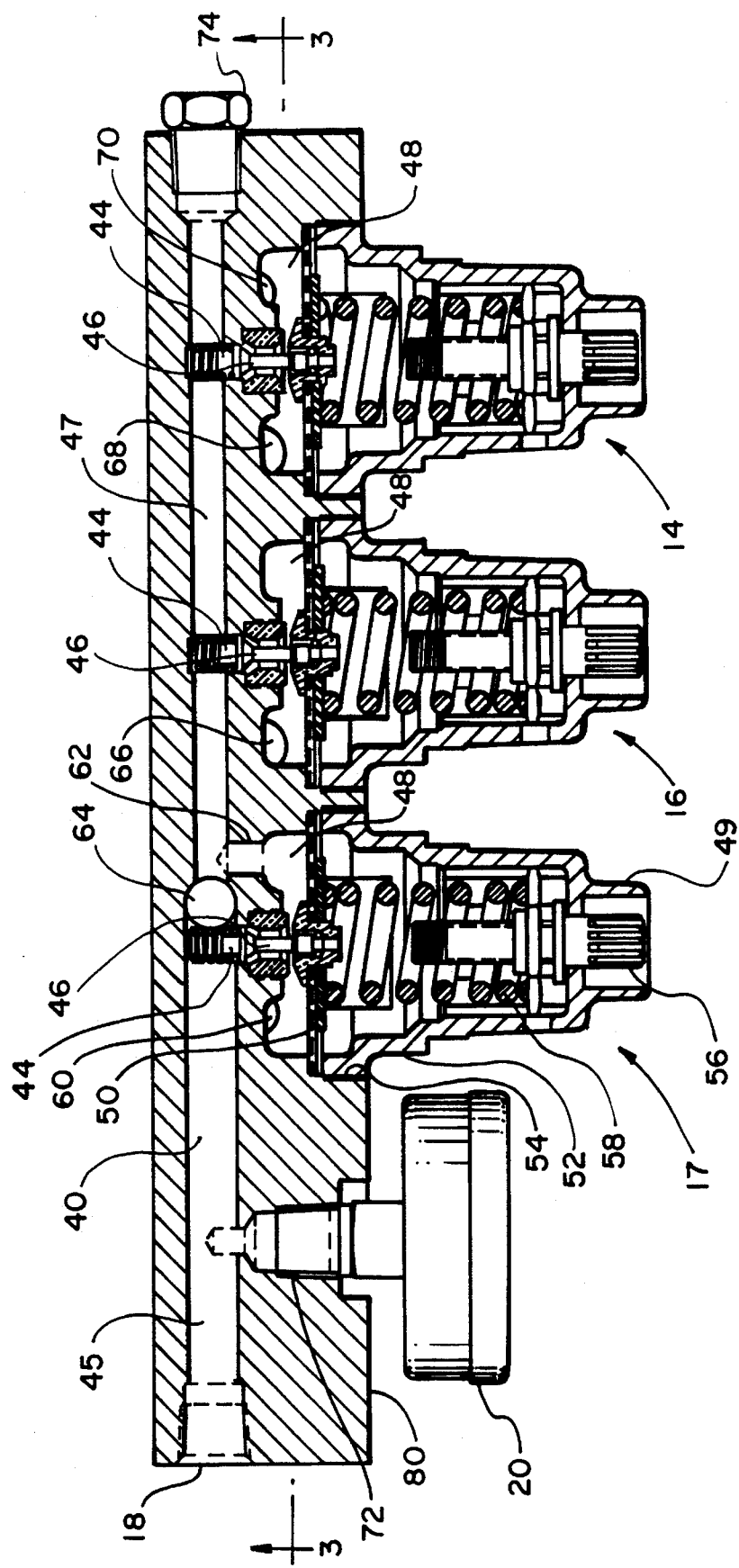
FIG. 2 is a horizontal section, taken at 2—2 of FIG. 1.
Figure 3:
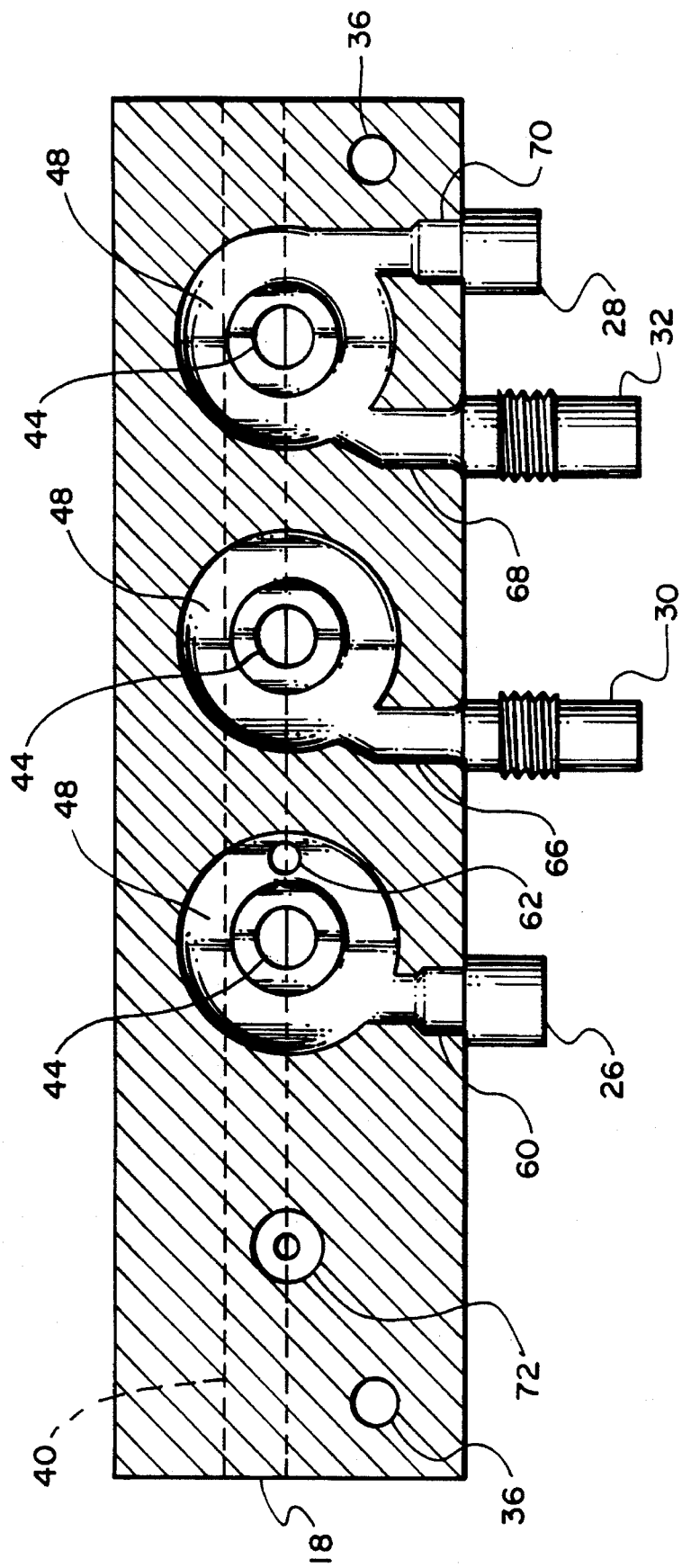
FIG. 3 is a vertical section, taken at 3—3 of FIG. 1.

Referring to FIGS. 1–3, pressure regulating unit 10 includes aluminum block 12, pressure regulators 14, 16, 17, high-pressure inlet fitting 18, for connection to a source (not shown) of a high-pressure gas, for example, carbon dioxide or nitrogen, high-pressure gauge 20, pressure relief valves 26, 28 (a third pressure relief valve, not shown, can be associated with regulator 16), and regulated pressure outlet fittings 30, 32. Block 12 has mounting holes 36 therethrough from the front surface of the block to the back mounting contact surface 38. Referring particularly to FIG. 1a, unit 10 includes a mounting rail 86 for attachment directly to a wall or to a wall-mounted supporting bracket (not shown).

Referring to FIG. 2, high pressure inlet 18 communicates with gas flow passage 40 provided from one side of block 12. Ball 64, at a junction between a small diameter portion and a large diameter portion, serves to divide passage 40 into a high-pressure segment 45 on the left and a low-pressure segment 47 on the right. Ball 64 is press fit in place with adhesive for permanent installation. Alternatively, high-pressure segment 45 and low-pressure segment 47 can be separate passages with material of block 12 separating the passages. The right-hand end of flow passage 40 is sealed closed with plug 74. Passage 40 communicates with three inlet valve passages 44 in block 12. Inlet valves 46 of pressure regulators 14, 16, 17, which are identical in construction, sit in inlet valve passages 44.

High-pressure gauge 20 sits in a passage 72 and communicates with flow passage 40 to indicate the pressure of the source. As can be seen in FIGS. 1 and 1a, the profile 82 of gauge 20 extending from a face 80 of block 12 is less than the profiles 84 of the regulators extending from face 80.

As can be seen from FIG. 2, inlet valve passages 44 and reduced pressure outlet chambers 48 are formed integrally in block 12. Referring particularly to regulator 17, diaphragm 50 covers outlet chamber 48 and is engaged by the end of bonnet 52, which is threadedly connected to threaded opening 54, formed in housing 12. An adjustable screw assembly 56 adjusts the force on spring 58 to adjust the pressure resulting in reduced-pressure outlet chamber 48 by action of valve 46. Screw assembly 56 is factory set and locked in position with, for example, an adhesive such as epoxy, prior to installation to achieve the desired pressure in outlet chamber 48. A safety cap 49 on bonnet 52 limits access to screw assembly 56.

Block 12 includes passage 60 leading from outlet chamber 48 in high pressure step down regulator 17 to pressure relief valve 26, and outlet passage 62 leading from outlet chamber 48 to gas flow passage 40 on the low pressure side of ball 64. Step down regulator 17 regulates the high-pressure gas provided to flow passage 40 on the low pressure side of ball 64.

Block 12 also includes outlet passages 66, 68 leading from outlet chambers 48 in pressure regulators 14, 16 to outlet fittings 30, 32 respectively, and a passage 70 leading from outlet chamber 48 in pressure regulator 14 to pressure relief valve 28.

Manufacture

In manufacture, block 12 is made from an aluminum extrusion, and high-pressure gas flow passage 40 is formed as part of the extrusion process and by drilling. Passages 60, 66, 68 and 70 are provided by drilling into block 12 from below. The openings to these passages are tapped to provide threaded connections for the fittings and the pressure relief valves which are threadedly connected thereto. Mounting holes 36 are also provided by drilling through block 12. The mounting structures provided by pressure gauge passage 72 and threaded openings 54, as well as inlet valve passages 44, and outlet chambers 48 are machined and tapped in the front face 80 of block 12.

Because all of the flow passages for unit 10 are within the block 12, the number of connections to be checked for leaks is reduced. In addition, the unit is compact and easy to mount.

Operation

In operation, high pressure gas supplied to inlet fitting 18 is supplied through gas flow passage 40 to the inlet valve of step down regulator 17. Gas entering step down regulator 17 has a varying pressure generally in the range of 450–1,000 psi for carbon dioxide gas and 450–1,800 psi for nitrogen. Low pressure gas 66 outputted by step down regulator 17 is at a substantially constant pressure in the range of about 130±5 psi. After passing through regulators 14, 16, the gas is at about 90±0.5 psi and 55±0.5 psi, respectively, or at any factory setting desired.

Use of step down regulator 17 provides the significant advantage that none of regulators 14, 16, 17 needs be adjusted during use, and the pressures being output by regulators 14, 16 do not need to be monitored. Thus additional pressure gauges, which are particularly subject to breakage, are not needed. Only the single pressure gauge displaying the status of the pressure source need be included so that the user can determine when the source requires replacement. After factory setting of the regulators to supply the desired pressures, screw assemblies 56 are fixed in place, for example, with epoxy.

Other Embodiments

In an alternative embodiment, an outlet passage from the second regulator can connect to an inlet passage to the third regulator to supply gas to the third regulator.

Other embodiments of the invention are within the scope of the following claims.

What is claimed is:

1. A pressure regulating unit for providing two different controlled pressures, said unit comprising a block made of a single piece of metal and having a mounting structure integrally provided thereon and a gas flow passage provided therein, said gas flow passage having a high pressure inlet for connection to a source of high-pressure gas having varying pressure and a first port for connection to a pressure regulator, and first, second and third pressure regulators that are supported by said mounting structure, said first regulator having a gas inlet communicating with said first port, said first regulator being a step-down regulator for supplying a substantially constant pressure gas to said second and third pressure regulators, said first, second, and third pressure regulators including pressure adjusters that have been permanently fixed in place after adjustment to a desired setting, said block carrying no more than a single pressure gauge, said single pressure gauge communicating with said first port.

2. The pressure regulating unit of claim 1 wherein said pressure adjusters are fixed in place with an adhesive.

3. The pressure regulating unit of claim 1 further including an attachment structure for mounting said unit.

4. The pressure regulating unit of claim 1 wherein said block defines chambers associated with said first, second and third regulators.

5. The pressure regulating unit of claim 4 wherein said block defines passages connecting said chambers to said gas flow passage, said passages leading to gas inlets in said first, second and third regulators.

6. The pressure regulating unit of claim 5 wherein said block defines an additional passage connecting said chamber of said first regulator to said gas flow passage.

7. The pressure regulating unit of claim 6 further comprising an obstruction in said flow passage dividing said flow passage into a first segment upstream of said first regulator and in communication with said gas inlet of said first regulator and a second segment downstream of said first regulator and in communication with said additional passage.

8. The pressure regulating unit of claim 7 wherein said obstruction is a ball located in said flow passage.

9. The pressure regulating unit of claim 4 wherein said block defines passages connecting said chambers of said second and third regulators to outlet passages.

10. The pressure regulating unit of claim 4 wherein said block defines passages connecting said chambers of said first and third regulators to relief valves.

11. The pressure regulating unit of claim 1 wherein at least one of said first, second, and third regulators has a first profile extending from said face of said block, and wherein said unit has said single pressure gauge mounted on said face, and said single pressure gauge has a second profile smaller than said first profile.

* * * * *